United States Patent
Wang et al.

(10) Patent No.: US 6,367,935 B1
(45) Date of Patent: Apr. 9, 2002

(54) METHOD AND DEVICE FOR ELIMINATING IMAGE SPECKLES IN SCANNING LASER IMAGE PROJECTION

(75) Inventors: Lingli Wang; Theo Tschudi, both of Darmstadt; Thorsteinn Halldorsson, Munich; Palmi Petursson, Hoehenkirchen, all of (DE)

(73) Assignee: EADS Deutschland GmbH, Munich (DE)

(*) Notice: Subject to any disclaimer, the term of this patent is extended or adjusted under 35 U.S.C. 154(b) by 0 days.

(21) Appl. No.: 09/355,288
(22) PCT Filed: Jan. 13, 1998
(86) PCT No.: PCT/EP98/00134
§ 371 Date: Oct. 12, 1999
§ 102(e) Date: Oct. 12, 1999
(87) PCT Pub. No.: WO98/34409
PCT Pub. Date: Aug. 6, 1998

(30) Foreign Application Priority Data
Jan. 31, 1997 (DE) .......................... 197 03 730

(51) Int. Cl.$^7$ ................................. G03B 21/14
(52) U.S. Cl. ....................... 353/122; 348/756
(58) Field of Search ................ 353/31, 122, 46, 353/69; 348/745, 756, 781; 359/15, 16

(56) References Cited

U.S. PATENT DOCUMENTS

| | | | | |
|---|---|---|---|---|
| 4,913,547 A | * | 4/1990 | Moran | 356/349 |
| 5,392,121 A | * | 2/1995 | Hosaka et al. | 356/360 |
| 5,434,662 A | * | 7/1995 | Rockwell et al. | 356/4.01 |
| 6,011,643 A | * | 1/2000 | Wunderlich et al. | 359/279 |
| 6,154,259 A | * | 11/2000 | Hargis et al. | 353/69 |
| 6,183,092 B1 | * | 2/2001 | Troyer | 353/31 |
| 6,184,981 B1 | * | 2/2001 | Hasson et al. | 356/303 |

FOREIGN PATENT DOCUMENTS

| | | |
|---|---|---|
| DE | 19508754 | 9/1996 |
| EP | 0 589179 | 3/1994 |
| WO | WO95/10159 | 4/1995 |

OTHER PUBLICATIONS

Article by J. M. Artigas, A. Felipe and M. J. Buades, "Contrast Sensitivity of the Visible System in Speckle Imagery", Journal of the Optical Society of America, A, vol. 11, No. 9, p. 2345, (1994).
Article by C. Deter "Laser–Display–Technology–Where Do We Stand?" in the publication "Physikalische Blätter", vol. 52, 1996, No. 11, p. 1129.
W. E. Glenn and G. J. Dixon "Bright Future Projected for Lasers in Electronic Cinemas", Laser Focus World, Nov., 1993, p. 73.

* cited by examiner

*Primary Examiner*—William Dowling
(74) *Attorney, Agent, or Firm*—W. F. Fasse; W. G. Fasse

(57) ABSTRACT

A method for the elimination of image speckles in a scanning laser projection is suggested, in which a phase hologram is used for dividing the illumination beam of the projector into partial beams. The partial beams are heterodyned again on the image screen within the image element (pixels) to be projected in such a way that differing speckle patterns are formed which average each other out in the eye of the viewer over time and/or space. Thus, a device is provided especially for the laser projection which substantially eliminates or reduces the speckles at the viewer. However, the beam form and the beam density are hardly or not changed.

14 Claims, 6 Drawing Sheets

METHOD AND DEVICE FOR ELIMINATING IMAGE SPECKLES IN SCANNING LASER IMAGE PROJECTION

FIELD OF THE INVENTION

The invention relates to a method for eliminating speckles in the distant field of a projection surface illuminated by a laser for example in connection with a laser image projection on an image screen and devices for its performance.

BACKGROUND INFORMATION

When using lasers for the illumination or image display on a projection surface, interferences occur due to the roughness of the surface in the space in front of the projection surface due to transit time differences of the waves that emanate from different portions of the projection surface. These interferences lead to a strong additional intensity modulation of the brightness distribution of the image screen in the eye of the viewer. The intensity modulation covers the image as a fine granulation pattern forming an additional noise proportion in the image which reduces the discernible resolution by a factor of up to 10 and leads, in multi-color laser images, to a color falsification by an incomplete color summation, see in this connection J. M. Artigas, A. Felipe and M. J. Buades, "Contrast Sensitivity of the Visual System in Speckle Imagery", Journal of the Optical Society of America, A, Vol. 11, No. 9, page 2345, (1994).

In recent years the technical preconditions for the realization of a laser projector with scanning laser beams has been substantially improved as disclosed, for example in an article by C. Deter "Laser-Display-Technology-Where Do We Stand?" in the publication "Physikalische Blätter", Vol. 52, 1996, No. 11, page 1129. Today substantially more efficient and more cost effective diode excited solid state lasers or fiber lasers can be employed. In the future even laser diodes with an electric/optical efficiency of 10 to 30% for monochromatic image projection in the colors red, green and blue (RGB) may be used. See in this connection for example W. E. Glenn and G. J. Dixon "Bright Future Projected for Lasers in Electronic Cinemas", Laser Focus World, November, 1993, page 73.

As far as we know there are no methods known at this time for the reduction or even elimination of laser speckles in laser beam projection systems which do not simultaneously diminish the image quality to such an extent that the advantages of the laser radiation disappears or that its use hardly brings any technical or economic advantages.

Basically, there are different methods for reducing laser speckles. Particularly in the laser and electron beam techniques different methods for the reduction of speckles are known. The following shall be mentioned here merely as examples: moving diffusing discs or phase plates, statistically controlled liquid crystal cells, glass fiber bundles with different transit times, moving glass fibers, widening of the line width of the laser and so forth.

The methods function only in the near field of the projected image pixel on the projection screen. For the viewer viewing the far field the transition differences are so small that the speckles do not disappear. The methods for destroying the localized coherence lead to a very strong beam degradation. As a result, an eventually reprocessed beam retains only a small intensity. The known methods for the destruction of the time coherence generally only result in a very limited increase of the emission band width and the resulting coherence length is still larger than the largest distance differences from the edges of a projected pixel to the viewer. The use of the shortest laser impulses (under 1 ps) for the reduction of the coherence length of the laser and thus the diminishing of the interference capability of the light is burdened with an enormous technical effort and expense.

SUMMARY OF THE INVENTION

It is the object of the invention to provide, especially for laser beam projections, a device which substantially eliminates or reduces the speckles perceived by the viewer while hardly or not changing the beam configuration and the beam density.

The above object has been achieved by a method for at least partly eliminating speckles in a laser image that is projected onto an image screen (37) having a screen surface area, by scanning said image screen by an illumination laser beam (34), comprising the following steps:

(a) projecting said illumination laser beam (34) onto said image screen (37), (b) dividing said illumination laser beam (34) on its way to said image screen (37) into a plurality of partial beams (36), (c) illuminating with each partial beam (36) a partial screen area that is smaller than said screen surface area illuminated by said illumination laser beam (34), (d) generating different speckle patterns by respectively moving said partial beams (36) within an image element (32) to be projected onto said image screen (37), and (e) heterodyning said different speckle patterns on one another in such a way that said different speckle patterns average (f) each other out of said laser image.

According to the invention there is also provided an apparatus for the performance of the present method, said apparatus comprising an image screen (37), a laser source for generating said illumination laser beam (34), a beam splitting element (35) positioned between said laser source and said image screen (37) for dividing said illumination laser beam (34) into a plurality of partial beams (36) and for illuminating with each partial beam (36) a partial screen area that is smaller than a surface area of said image screen (37) illuminated by said illumination laser beam (34), scanning means for moving said partial beams (36) within a respective image element (32) on said image screen to form different speckle patterns, and heterodyning means for superimposing said different speckle patterns on one another in such a way that said different speckle patterns average each other out of said laser image.

The invention is based on the experimental fact that the speckle modulation decreases in the eye of the viewer when the viewer moves his or her head rapidly, namely when the eye averages the speckle images in time and space. Similarly, motion of the projection screen causes the disappearance of the speckle pattern. The motion of the projection screen is performable and shall be described in detail in the following. However, moving larger screens is cumbersome and expensive.

Thus, according to the invention the motion of the projection screen is replaced by the motion of the projection beam. For this purpose it is not necessary that the image screen or the projected pixel are moved relative to each other, nor is it necessary that the screen or the pixel are moving relative to the viewer. Rather, the projected pixel shall be divided and the subdivided areas shall move within the pixel.

This object is achieved according to the invention with the aid of a phase hologram having a high diffraction efficiency in combination with the scattering characteristic of the projection screen. The laser beam is suitably divided into different partial beams by the hologram inserted into the beam path, whereby each of the individual partial beams illuminates a smaller surface area than the original laser beam. Each partial beam produces on the projection screen a different speckled pattern. The instantaneous surface roughness or topography thereby enters significantly into the speckle formation.

By the movement of the partial beams over the pixel surface of the image speckle to be produced, for example by the rotation of the hologram or by installation of a scanner (beam deflector) in the beam path for scanning the image or any other suitable device for the beam movement one obtains a different, moving speckle field for each partial beam. The viewer now sees simultaneously the heterodyning of all the speckle images produced by the moving partial beams. Due to the integration process in the eye, the speckle contrast is thereby averaged in space and time. For the eye of the viewer the speckles have disappeared.

When a phase hologram is used for the present purpose, the known principles and manufacturing methods may be used for producing the phase hologram. Important for this purpose is the maintaining of a good beam collimation and a large diffraction efficiency. This can, for example be achieved by a multiphase hologram. The hologram may, for example be arranged in front of the image scanning system or downstream of the image scanner in an intermediate image plane of the projection lens or in another suitable position.

The motion of the partial beams can be achieved in that, for example the phase hologram is rotated about its optical axis or in that the beams are moved on the screen by the scanner itself. However, other known image rotation principles can be employed as well. The rotational speed of the hologram is to be adapted to the scanner system with regard to the following factors: integration time of the eye, image frequency, number of the projected pixels per image, geometry of the viewer room and so forth.

As has been shown experimentally, it is possible to use simultaneously the rotation and translatory motion of the partial beams by respectively moving the scanner.

The only requirement to be met by the image screen is, that the screen is not constructed as an optical mirror per se. This is not a limitation for the invention because after reflection at a mirror either no speckles or only minute speckles occur and a mirror is excluded anyway because in such a case the projection geometry would be satisfied only for one point in space and thus viewing the image would be impossible, more or less.

In order to achieve the splitting of a laser beam by a phase hologram into partial beams the diffracting structures are arranged in grid form in two dimensions, either regularly or irregularly. This grid form structure is equipped with a further structure for the forming of the produced partial beams (collimation, focussing). This further structure may look like or similar to a Fresnel zone plate.

This basic structure can be inscribed individually for each partial beam as an array in a hologram or it can be distributed for all partial beams over the entire hologram surface. The structure can, however, be calculated through direct Fourier transformation or other respective formalisms.

An individual hologram written in accordance with the above instructions can be used directly. However, it may be advantageous to copy such a hologram structure and to use it in an arrangement as an array. In this manner a redundance of the beam forming element is achieved and also a substantial independence of the system from the used beam cross-section and from the intensity distribution on the hologram plate. Additionally, a precise centering of the hologram relative to the beam axis is no longer necessary.

BRIEF DESCRIPTION OF THE DRAWINGS

The invention will be described in the following with reference to the accompanying drawings, wherein.

DETAILED DESCRIPTION OF PREFERRED EXAMPLE EMBODIMENTS AND OF THE BEST MODE OF THE INVENTION

Figure 1:
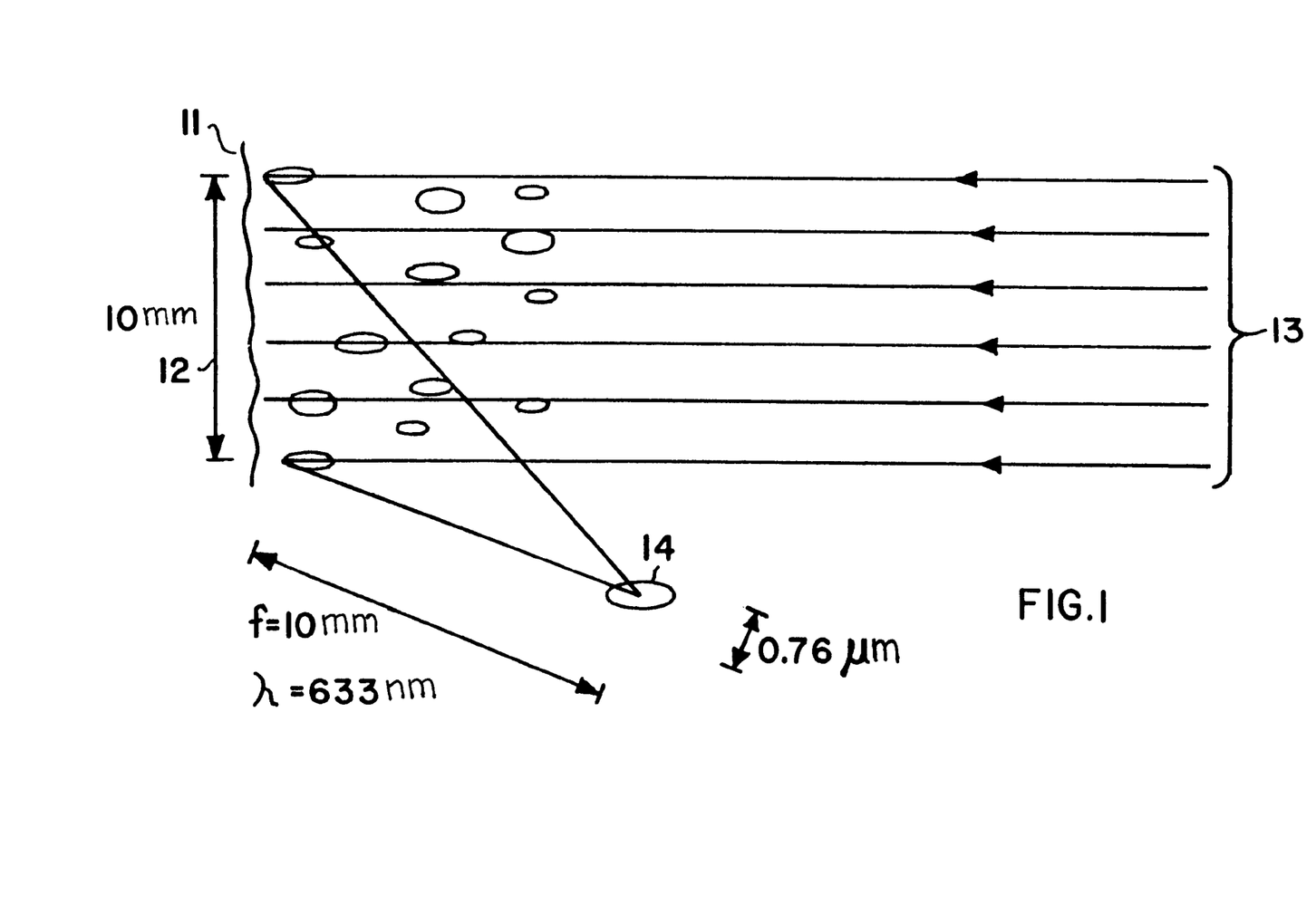
FIG. 1 is a schematic illustration of the formation of speckles in the space in front of an image screen in the near field.

FIG. 1 shows the speckles in the near field of the projection screen 11. For a distance of 10 mm from the image spot 12 of an incoming projection beam 13 having a diameter of 10 mm, the speckles 14 have a diameter in the range of about 1 $\mu$m for a wavelength $\lambda$=633 nm. By way of a relative phase shift between the upper and lower edge of up to $2\pi$ it is possible to shift a speckle over its diameter and thereby average it away in the eye of the viewer with regard to space and time.

Figure 2:
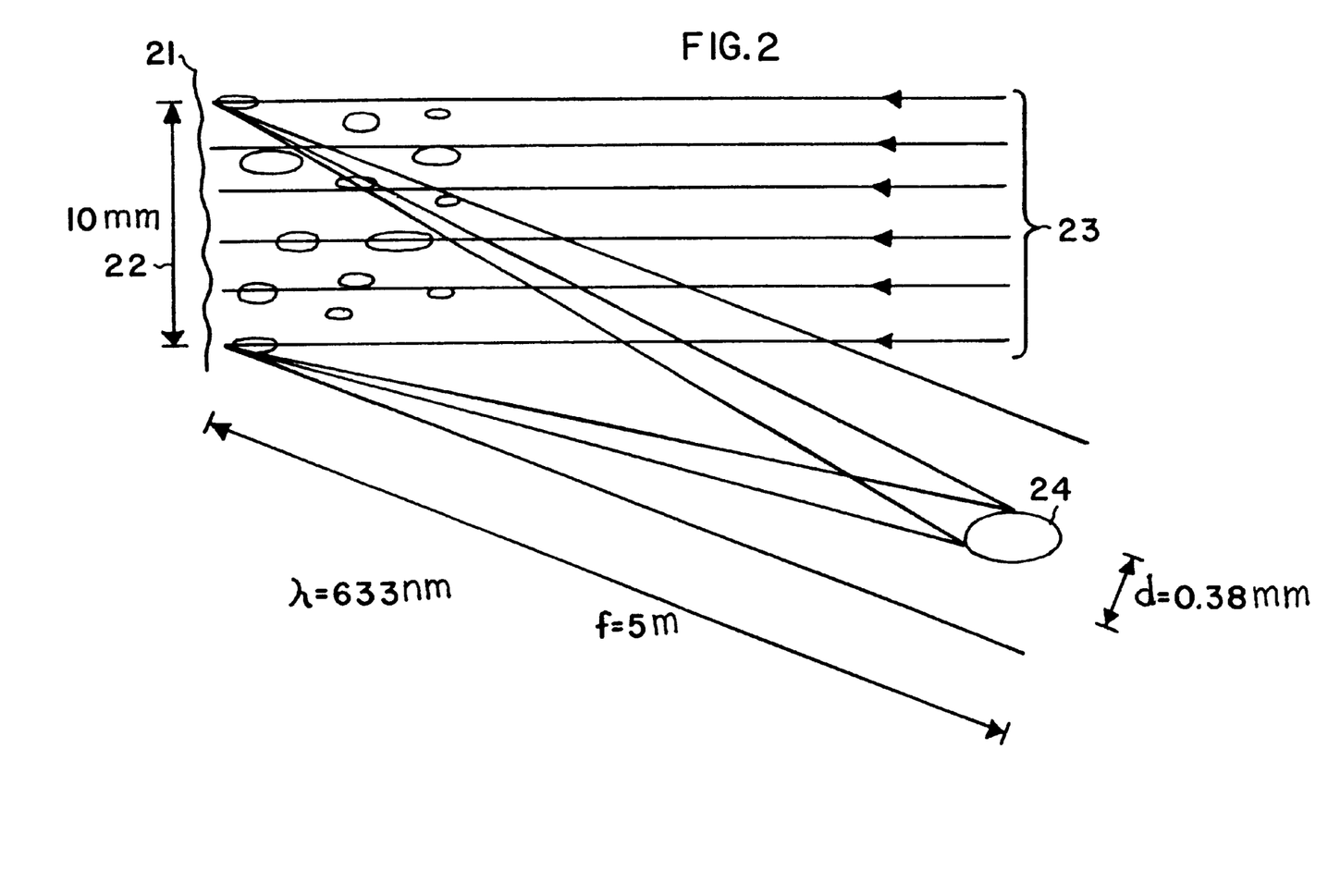
FIG. 2 is a schematic illustration of the formation of the speckles in the space in front of an image screen in the distant field.

FIG. 2 shows speckles 24 in the distant field of the projection screen 21 corresponding to the situation of a large image laser projection 23 with a viewer spacing of 5 m and an image spot diameter 22 of 10 mm. The speckles 24 at the point of a viewer are already relatively large with a diameter of about 0.5 mm. A relative phase shift of the upper edge to the lower edge of the illumination beam provides only an unnoticeable displacement of the speckle at the viewer, whereby a reduction of the speckle contrast is thus not possible.

Figure 3A:
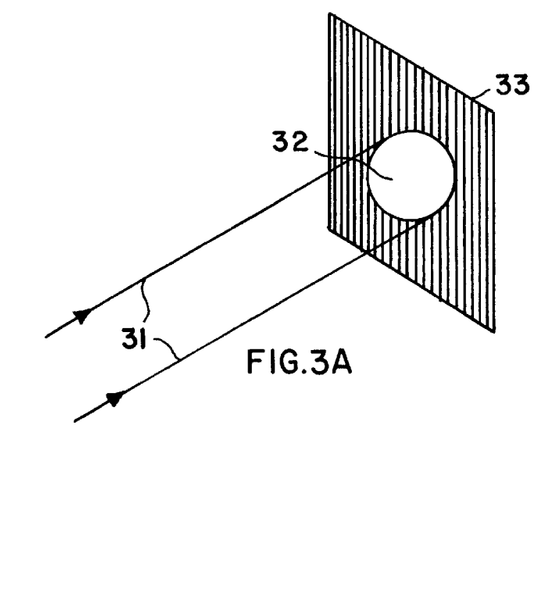
FIG. 3A is a schematic illustration of the beam geometry in connection with laser projection without dividing the illumination beam.
Figure 3B:
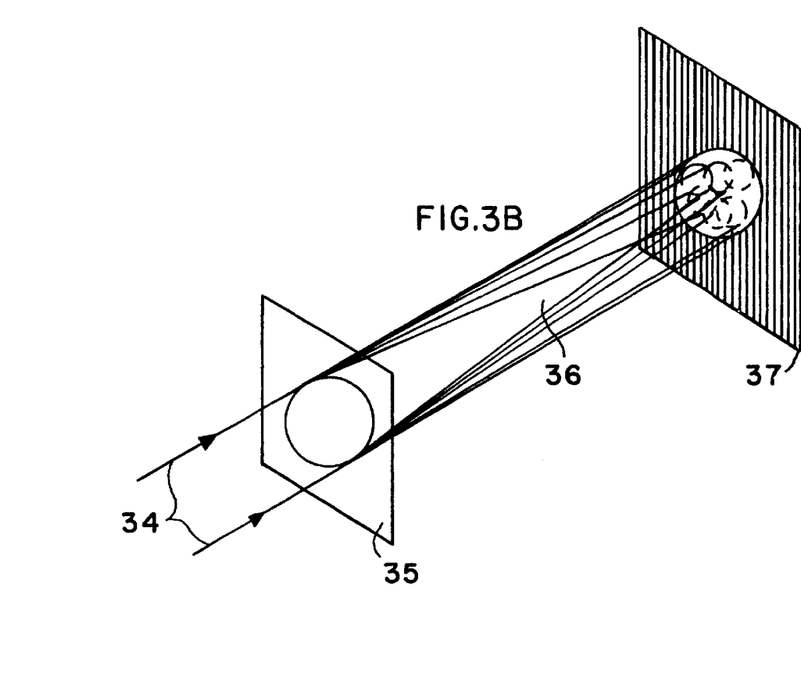
FIG. 3B shows the division of the illumination beam into a plurality of partial beams by a phase hologram as taught by the invention.

FIGS. 3A and 3B show the beam geometry for the reduction of the spatial coherence of the light distribution scattered by the image screen. According to FIG. 3A an untreated projection beam 31 illuminates an image element or pixel 32 on the image screen 33. Speckles occur as in FIG. 2. According to the invention as shown in FIG. 3B a laser projection beam 34, also referred to as illumination beam, is divided by a phase hologram 35 into N partial beams 36 which are heterodyned on the image screen 37 only partially or not at all. Thus, each partial beam produces its own speckle pattern which depends on the respective surface of the screen. A motion of the small image spot leads to a motion of the individual speckled patterns, which heterodyne on one another in the viewer's eye so that within a time and/or space average the speckles are no longer visible.

Instead of dividing the projection or illumination beam 34 by the phase hologram 35 as shown in FIG. 3B, it is possible to replace the hologram 35 by an array of lenses or by a Fresnel zone plate.

Figure 4A:
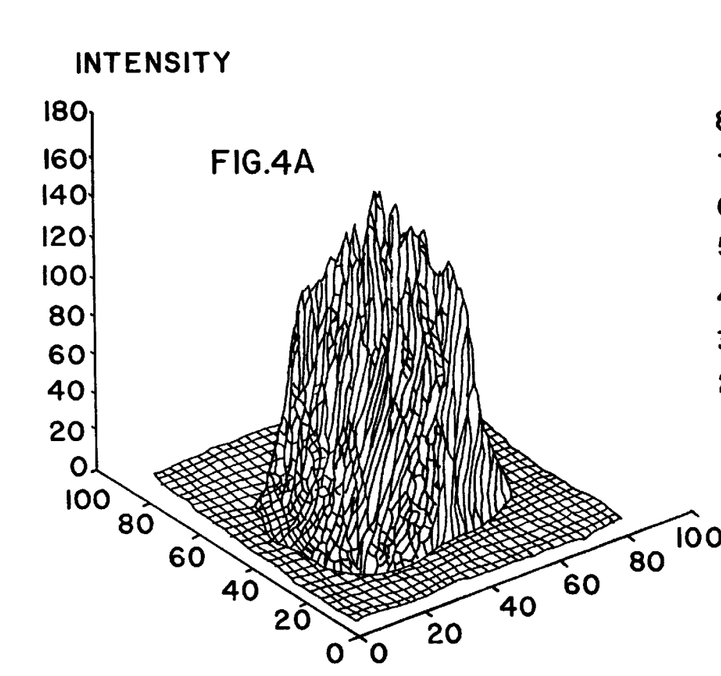
FIG. 4A is a camera recording of the visible intensity distribution in the far range of the image spot without a phase hologram.
Figure 4B:
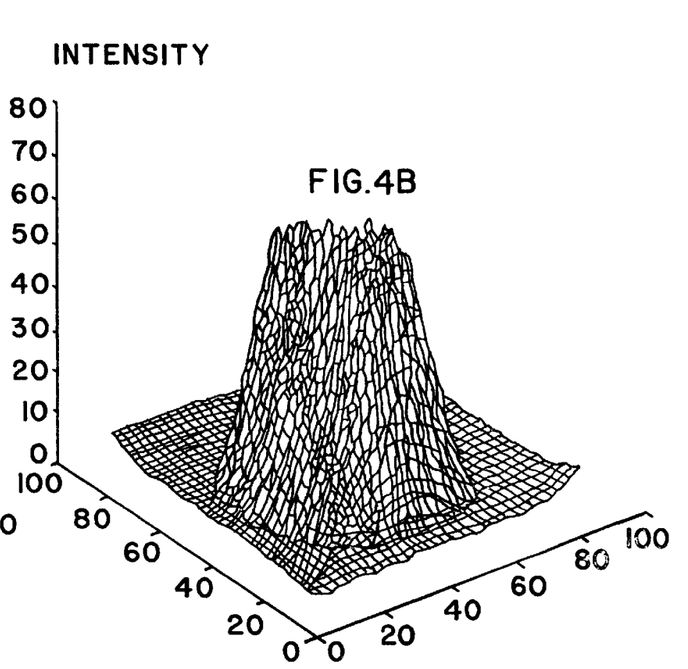
FIG. 4B is a similar recording with a phase hologram as taught by the invention.

FIG. 4 shows an example of an intensity distribution of an image element or pixel as seen by a viewer. In FIG. 4A an unmodified laser beam is used. Speckles show a high modulation of the intensity distribution. In FIG. 4B the pixels are illuminated with 64 partial beams as taught by the invention. The intensity modulation occurring due to speckles is strongly suppressed.

Figure 5:
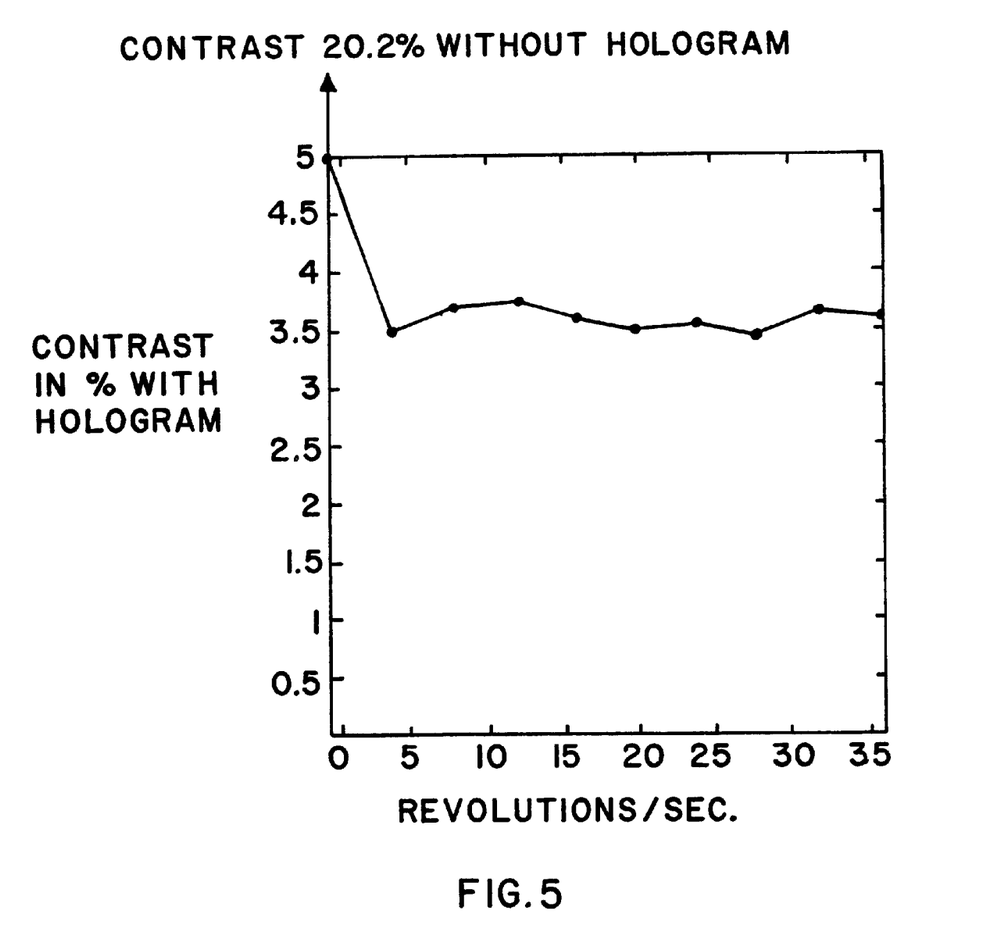
FIG. 5 shows a measured contrast of an image spot.

FIG. 5 shows the measured contrast over the image spot as a percentage and as a function of an r.p.m. of the phase hologram.

Figure 6A:
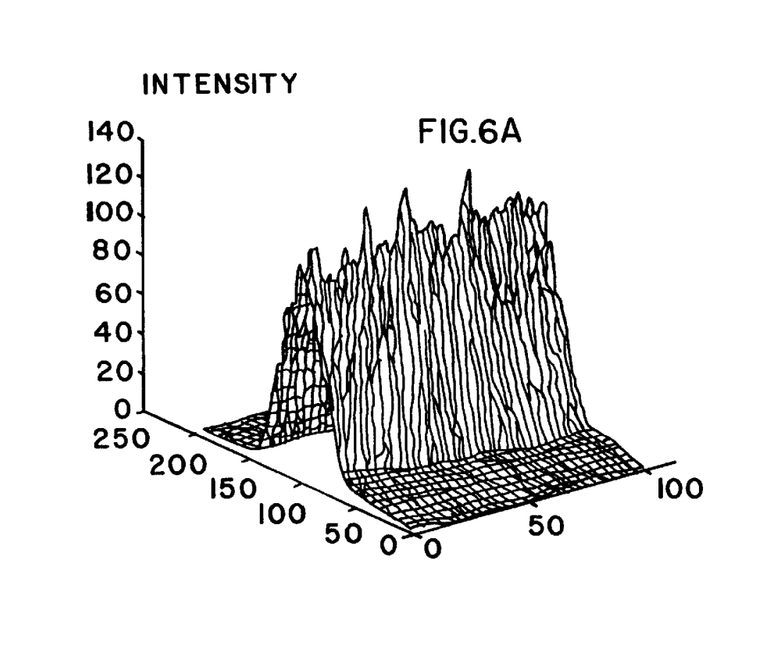
FIG. 6A shows a measured image line contrast without a hologram.
Figure 6B:
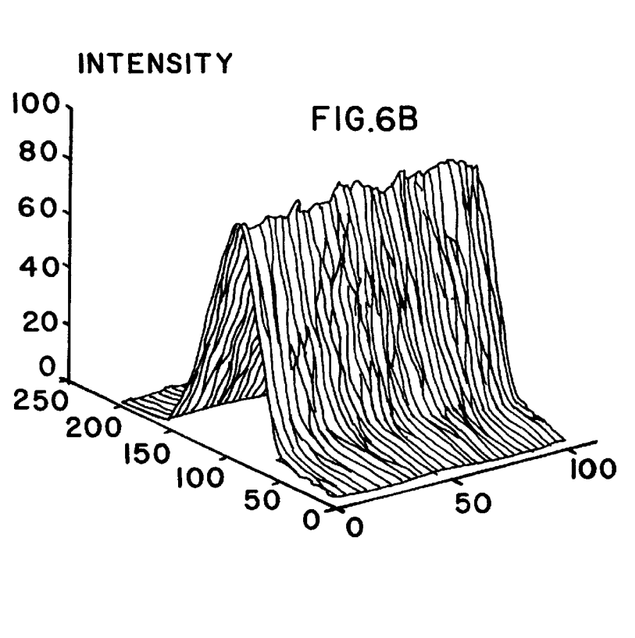
FIG. 6B shows such contrast with a hologram.

FIG. 6A shows the measured contrast within a scanned image line at the point of the viewer without a phase hologram. FIG. 6B shows the measured contrast of a scanned image line with a stationary hologram.

For the calculation of the hologram structure almost all of currently known calculation algorithms are suitable.

In order to achieve high diffraction efficiencies, phase holograms with several phase stages or even blazed hologram structures are necessary. Experiments have shown that, for example, 4 to 16 phase stages are sufficient.

The hologram structures can be produced by laser beam writers, electron beam writers, and so forth. However, suitable scale reduction methods applied to structures drawn otherwise may also be used. For typical beam diameters of 5 to 10 mm, the phase plates have the same diameters, namely 5 to 10 mm. The structural dimensions in the hologram are typically in the range of $\mu$m and larger. The production may take place by photoresist techniques, by build up techniques with several layers, by chemical etching, or ion beam etching on glass or other materials or by means of other already existing recording methods. Important is, above all, a high diffraction efficiency of the element produced.

The original laser beam was divided into 4, 8, 16, 32, 64 and 128 partial beams. The experiment showed that 16 partial beams are sufficient and yield good results. The speckle reduction is similar with 32, 64 and 128 partial beams.

The hologram, however, may also be produced by inscribing on a thin or thick hologram layer by way of photographic or other known processes.

It is to be understood that the phase hologram according to the invention may be used in connection with multi-color projection, for example with the colors, red, green and blue (RGB), either in the form of a single hologram after collimation of all colors in the beam path or as separate phase holograms in the individual color channels for a special optimization. The removal of the speckles with the phase hologram according to the invention can be used not only in connection with full image projection systems, but also for written characters and drawings.

Furthermore, the phase hologram of the invention can be used not only in connection with front projection screens, but also for the speckle reduction in connection with rear projection, light transmitting screens, or in connection with a scanned illumination of a hologram.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for at least partly eliminating speckles in a laser image that is projected onto an image screen (37) having a screen surface area, by scanning said image screen by an illumination laser beam (34), comprising the following steps:

(a) projecting said illumination laser beam (34) onto said image screen (37), (b) dividing said illumination laser beam (34) on its way to said image screen (37) into a plurality of partial beams (36), (c) illuminating with each partial beam (36) a partial screen area that is smaller than said screen surface area illuminated by said illumination laser beam (34), (d) generating different speckle patterns by respectively moving said partial beams (36) within an image element (32) to be projected onto said image screen (37), and (e) heterodyning said different speckle patterns on one another in such a way that said different speckle patterns average each other out of said laser image.

2. The method of claim 1, comprising performing said step of dividing said illumination laser beam (34) by any one of a phase hologram, an array of lenses, and a Fresnel zone plate for producing at least two partial beams.

3. An apparatus for at least partly eliminating speckles in a laser image produced by scanning an image screen (37) with an illumination laser beam (34), said apparatus comprising said image screen (37), a laser source for generating said illumination laser beam (34), a beam splitting element (35) positioned between said laser source and said image screen (37) for dividing said illumination laser beam (34) into a plurality of partial beams (36) and for illuminating with each partial beam (36) a partial screen area that is smaller than a surface area of said image screen (37) illuminated by said illumination laser beam (34), scanning means for moving said partial beams (36) within a respective image element (32) on said image screen to form different speckle patterns, and heterodyning means for superimposing said different speckle patterns on one another in such a way that said different speckle patterns average each other out of said laser image.

4. The apparatus of claim 3, wherein said scanning means are rotatable for moving said partial beams (36) on said image screen (37).

5. The apparatus of claim 3, wherein said scanning means are periodically deflectable for moving said partial beams (36) on said image screen (37).

6. The apparatus of claim 3, wherein said beam splitting element (35) is a phase hologram, and further comprising a controllable liquid crystal cell for varying a structure of said phase hologram as a function of time to thereby control a motion of said partial beams on said image screen.

7. The apparatus of claim 3, wherein said scanning means comprise an optical image rotator positioned behind said beam splitting means for rotating said partial beams (36).

8. The apparatus of claim 3, wherein said beam splitting element (35) is arranged in any one of the following positions: in front of said scanning means, in said scanning means, and behind said scanning means as viewed in a direction of travel of said illumination laser beam.

9. The apparatus of claim 3, wherein said laser source is a laser image projector including a projection objective and wherein said beam splitting element is positioned in an intermediate image plane of said projection objective of said laser image projector.

10. The apparatus of claim 3, wherein said beam splitting element (35) is a stationary phase hologram and wherein said scanning means comprise an image scanner for moving said partial beams on said image screen (37).

11. The apparatus of claim 3, wherein said beam splitting element comprises one phase hologram (35) provided for three basic colors for color projection.

12. The apparatus of claim 3, wherein said beam splitting element comprises one phase holograms for each of three basic colors for color projection.

13. The apparatus of claim 3, further comprising at least one additional optical element positioned for shaping a profile of said partial beams.

14. The apparatus of claim 3, wherein said image screen (37) is any one of a front projection screen, a rear projection screen and a hologram forming a projection screen.

* * * * *